United States Patent [19]
Irvin

[11] Patent Number: 5,425,985
[45] Date of Patent: Jun. 20, 1995

[54] BELT CONSTRUCTION HAVING A MOCK LENO FABRIC AS AN IMPACT BREAKER OR SPLICE INSERT

[75] Inventor: Cynthia A. Irvin, Marengo, Ohio

[73] Assignee: The Goodyear Tire & Rubber Company, Akron, Ohio

[21] Appl. No.: 330,774

[22] Filed: Oct. 28, 1994

[51] Int. Cl.$^6$ ............................................. B32B 7/00
[52] U.S. Cl. ............................... 428/250; 428/246; 428/257; 428/902; 428/57; 428/60
[58] Field of Search ............... 428/250, 257, 246, 902, 428/57, 60

[56] References Cited
U.S. PATENT DOCUMENTS

| | | | |
|---|---|---|---|
| 3,224,566 | 12/1965 | Elliott | 428/250 |
| 5,110,656 | 5/1992 | Inoba et al. | 428/257 |
| 5,196,258 | 3/1993 | Keller et al. | 428/250 |
| 5,240,531 | 8/1993 | Todo et al. | 428/250 |

*Primary Examiner*—James J. Bell
*Attorney, Agent, or Firm*—Marc R. Dion, Sr.

[57] ABSTRACT

A belt construction having a reinforcement layer and at least one cover layer incorporating a layer of mock leno fabric having a tensile strength of at least 2800 kN/m width.

4 Claims, 4 Drawing Sheets

BELT CONSTRUCTION HAVING A MOCK LENO FABRIC AS AN IMPACT BREAKER OR SPLICE INSERT

BACKGROUND OF THE INVENTION

Splice inserts and breaker materials up to now have utilized conventional belt fabrics and some light to mid-weight leno fabrics. Conventional fabrics for belts include plain weaves, rib weaves and crow-foot (broken twill) weaves which have warp cover factors above 75%. These fabrics, while providing needed strength and stability, prevent rubber penetration and, therefore, limit the mechanical bonding by virtue of the high cover factors. Lack of mechanical bonding in severe applications can lead to delamination where the chemical bond cannot tolerate the shear stresses. When a conventional fabric is used as a splice material, shear stresses can cause a cover crack across the belt at the interface of the fabric insert and the carcass fabric/compound. This cracking can also lead to peeling or breaking the splice apart. In splices, fabric fingers are often cut in the insert to dissipate the shear stresses, but the finger can also begin to peel away.

Leno fabrics are not affected by the shear stresses as are conventional fabrics, but they have a weaving limitation. Lenoing mechanisms are simply not made for heavy constructions. The state of the art leno heddles can only lift up to a mid-weight fabric (about 15 oz/yd$^2$) at most. Even if the mechanisms could tolerate more, the twisting motion would require so much space that one could not pack enough filling yarns in to stabilize the fabric adequately or provide enough strength. Most available leno fabrics are under 10 oz/yd$^2$. A few have been manufactured in the 10–20 oz/yd$^2$ range.

The remaining lenos, above 20 oz/yd$^2$, are rip breakers which have very light weight warps compared to the filling yarns. The rip breakers are used solely to help block the propagation of longitudinal rips.

SUMMARY OF THE INVENTION

According to the practice of the present invention, there is provided a belt construction having a reinforcement layer and at least one cover layer incorporating therein a layer of mock leno fabric having a tensile strength of at least 2800 kN/m width. It is preferred that the mock leno fabric have a cover factor of less than 70%.

DETAILED DESCRIPTION OF THE INVENTION

Figure 1:
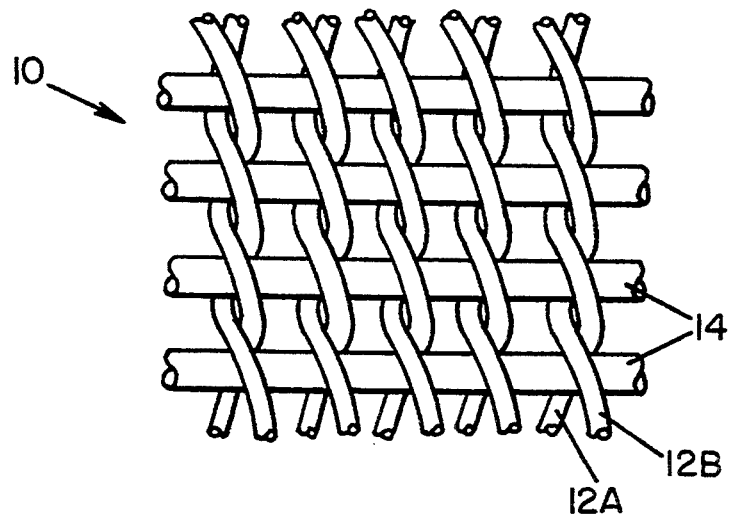
FIG. 1 illustrates a full body leno fabric which has been used in belt constructions.

The tensile strength for a full bodied leno 10 as illustrated in FIG. 1 is limited by the size of the yarn which is used to put the twist in the warp yarns 12A, 12B between the filling yarns 14. In addition, the machinery required to make such a weave is very complicated.

Figure 2:
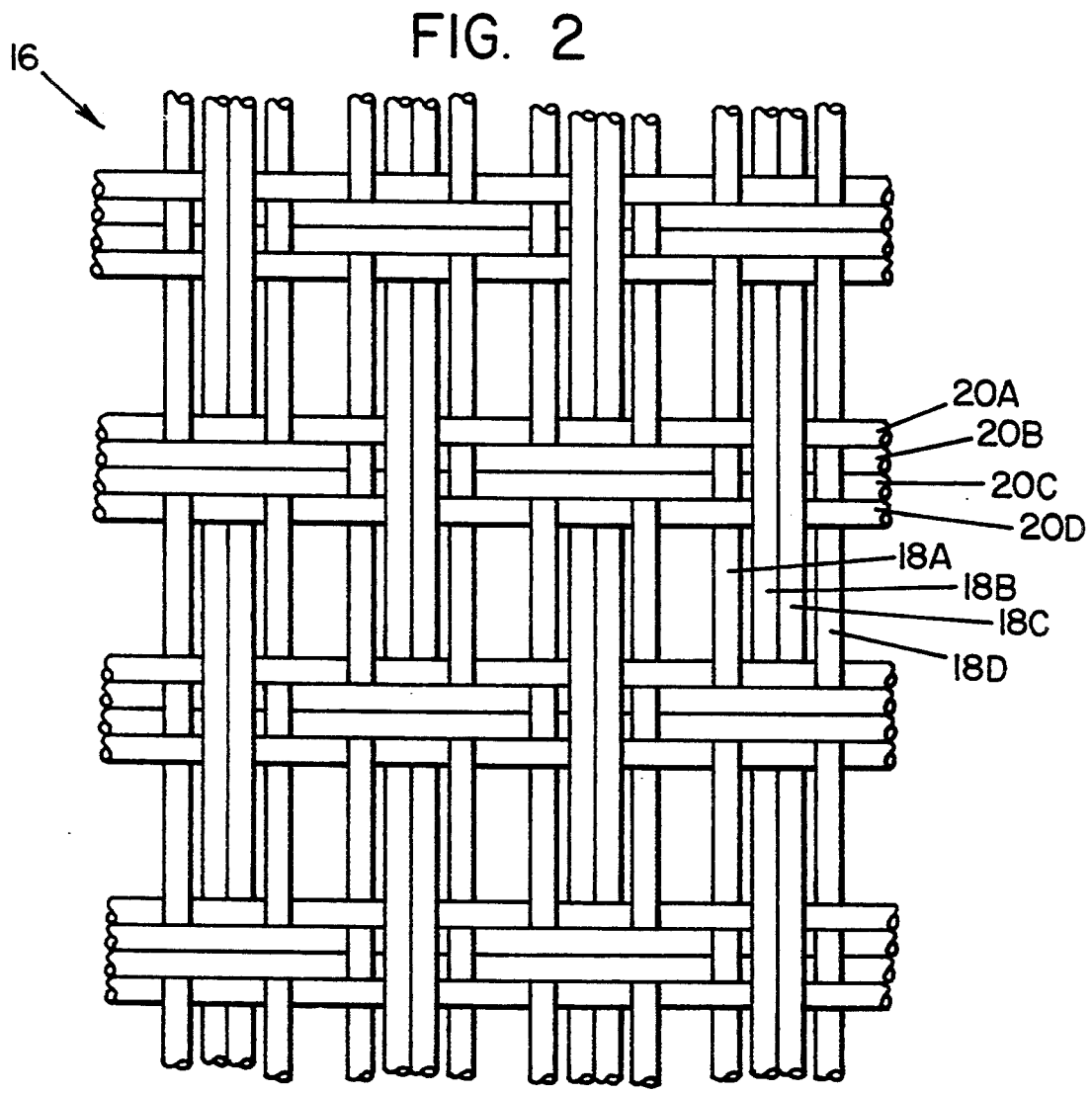
FIG. 2 illustrates a mock leno fabric construction which can be used in the practice of the present invention.
Figure 3:
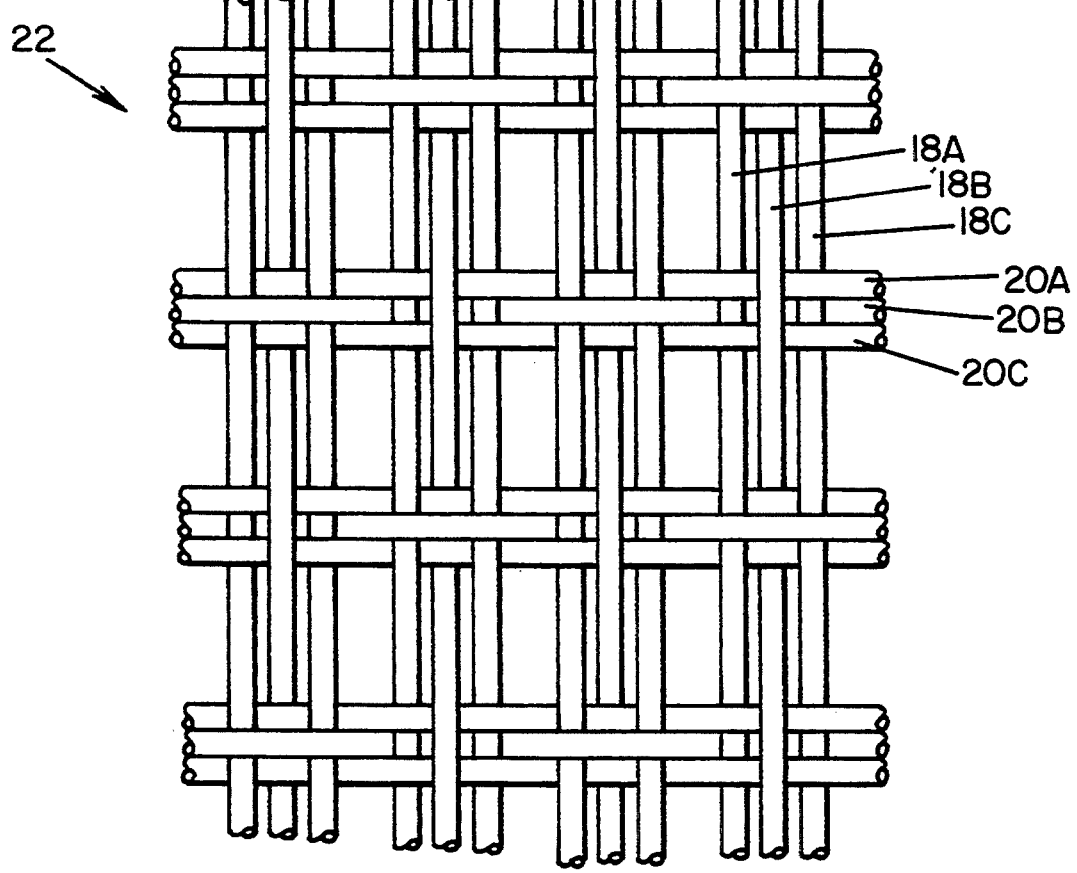
FIG. 3 illustrates an alternate mock leno construction which can also be used in the practice of the present invention.

The mock leno fabric as illustrated in FIGS. 2 and 3 can be produced on conventional looms. The mock leno as seen illustrated in FIG. 2 represents a common 4×4 construction 16 wherein warp cords 18A, B, C and D are interlaced in any convenient pattern with fill cords 20A, B, C, D.

FIG. 3 illustrates a mock leno 22 having a 3×3 construction. Fabric constructions may be created that are of equal strengths in both directions or stronger in either the warp or the filling direction. Warp and filling counts may vary, if necessary, to create an open but stable fabric. Suitable fibers such as polyester, nylon, glass, metal, carbon, and polysulfides may be used to make the mock leno fabrics. The fibers may be in monofilament, multifilament, or staple form. Yarns used in the mock leno can consist of one or more fibers (hybrids) and they may be of different size, twist or color. One or more yarn constructions may be used in any combination in the mock leno fabric.

Figure 4A:
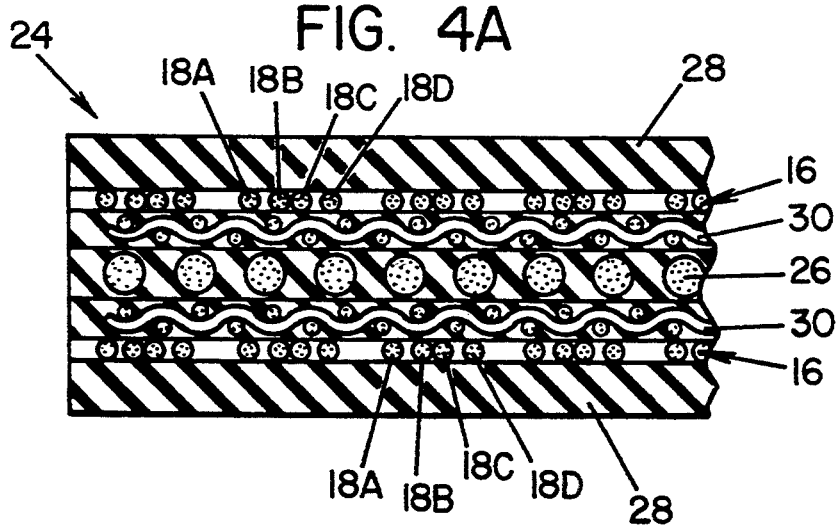
FIG. 4A, 4B and 5 illustrate various belt constructions utilizing the mock leno fabrics.
Figure 4B:
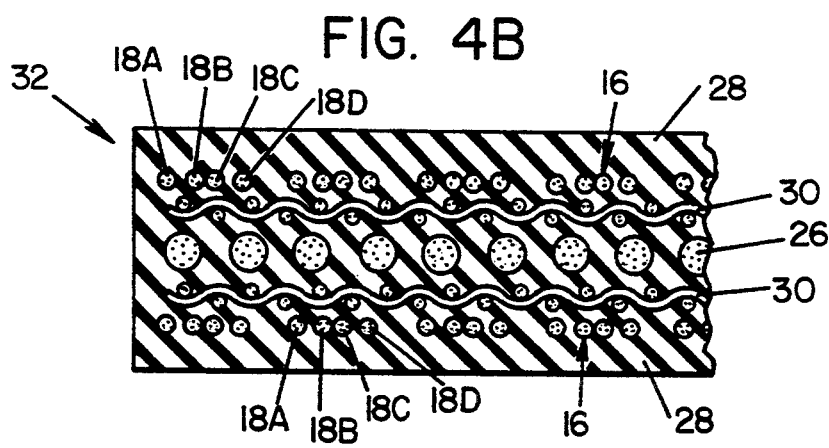
Figure 5:
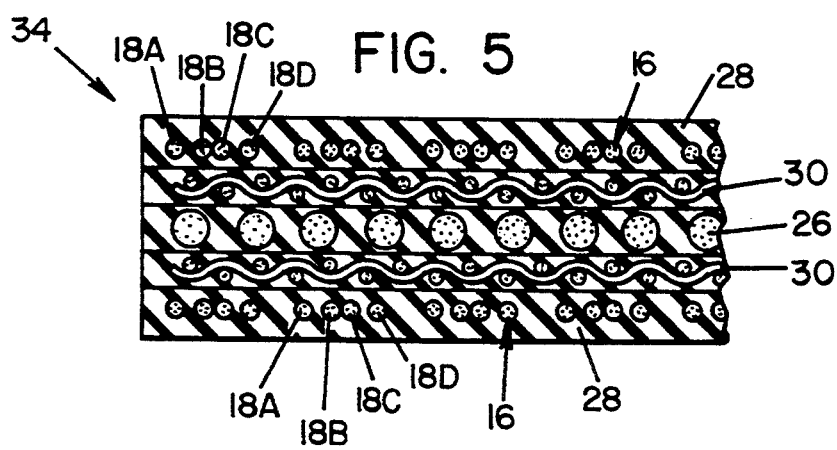

It is not intended that the mock leno fabrics used in the instant invention be a replacement for the conventional reinforcement layers, but as breakers as illustrated in FIGS. 4A, 4B and 5 wherein conventional reinforcement is shown as steel wires 26 and fabric layers 30 between cover layers 28. FIG. 4A illustrates the construction of a belt 24 prior to vulcanization while belt 32 of FIG. 4B illustrates the same construction after vulcanization.

FIG. 5 illustrates a belt 34 wherein the mock leno fabric has been incorporated into the cover layer 28 prior to assembly.

Figure 7:
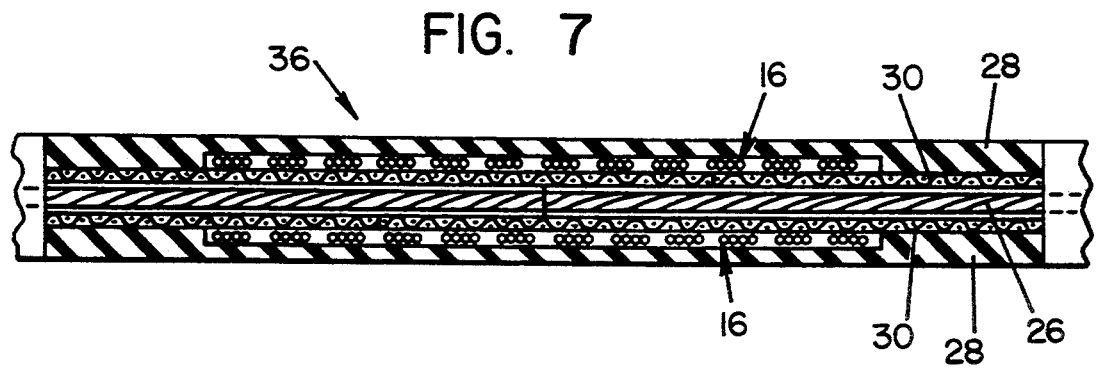
FIG. 7 is a longitudinal cross-section of the splice area taken along line 7—7 of FIG. 6 illustrating the various layers wherein a splice insert of the mock leno fabric is utilized.
Figure 6:
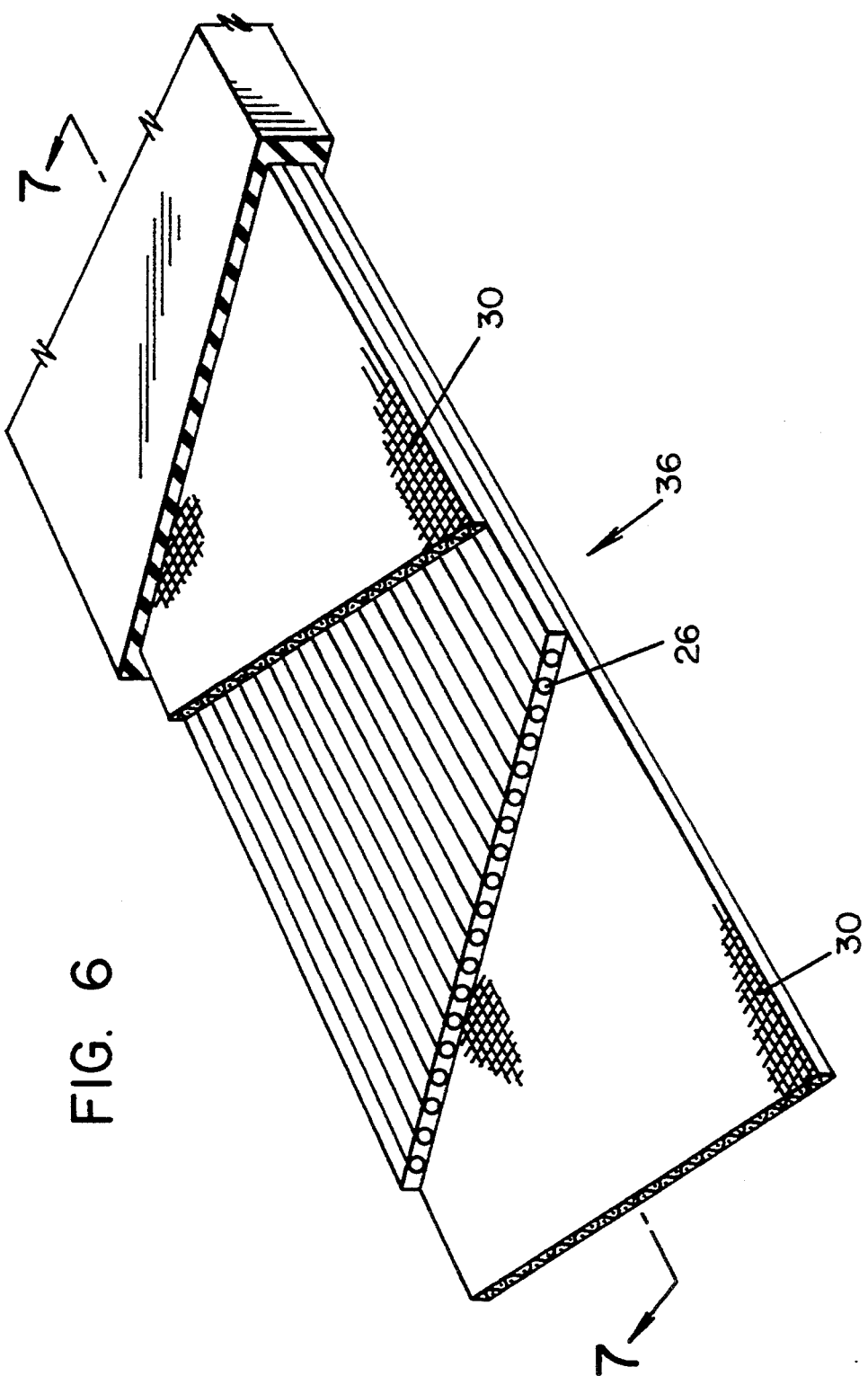
FIG. 6 is an illustration of a belt construction which has been prepared for splicing.

FIG. 6 illustrates a belt end which has been prepared for splicing wherein the various layers of reinforcement have been cut on a bias to be matched with complementary layers of reinforcement from the other end as illustrated in FIG. 7 wherein a mock leno fabric layer has been inserted above and below the splice area 36 to provide additional strength and to prevent splice opening.

While certain representative embodiments and details have been shown for the purpose of illustrating the invention, it will be apparent to those skilled in this art that various changes and modifications may be made therein without departing from the spirit or scope of the invention.

What is claimed is:

1. In a belt construction having a reinforcement layer and at least one cover layer, the improvement wherein there is incorporated in said belt a layer of mock leno fabric having a tensile strength of at least 2800 KN/m width.

2. The belt according to claim 1 wherein said mock leno layer is incorporated within said cover layer.

3. The belt according to claim 1 wherein said mock leno layer is incorporated between said reinforcement layer and said at least one cover layer.

4. The belt according to claim 1 wherein said mock leno fabric has a cover factor of less than 70%.

* * * * *